Dec. 16, 1941.  E. F. NORELIUS  2,266,397
TRANSMISSION
Filed March 17, 1939  6 Sheets-Sheet 1

Dec. 16, 1941.　　　　E. F. NORELIUS　　　　2,266,397
TRANSMISSION
Filed March 17, 1939　　　6 Sheets-Sheet 2

Inventor
E. F. Norelius
by
Attorney

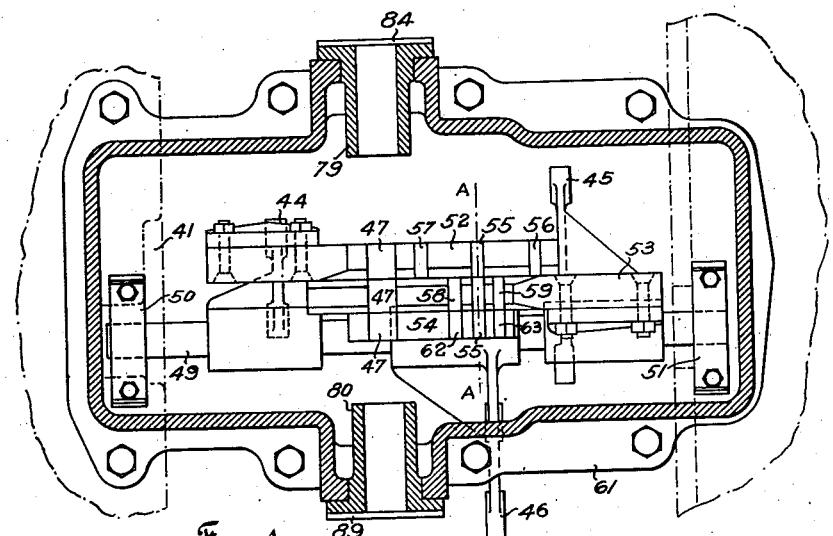

Dec. 16, 1941.　　　E. F. NORELIUS　　　2,266,397
TRANSMISSION
Filed March 17, 1939　　　6 Sheets-Sheet 4

Dec. 16, 1941.  E. F. NORELIUS  2,266,397
TRANSMISSION
Filed March 17, 1939  6 Sheets-Sheet 5

Inventor
E. F. Norelius
by
Attorney

Dec. 16, 1941.　　　E. F. NORELIUS　　　2,266,397
TRANSMISSION
Filed March 17, 1939　　　6 Sheets-Sheet 6

FIRST

SECOND

THIRD

FOURTH

FIFTH

REVERSE

Inventor
E. F. Norelius
by
Attorney

Patented Dec. 16, 1941

2,266,397

UNITED STATES PATENT OFFICE 2,266,397

TRANSMISSION

Emil F. Norelius, Springfield, Ill., assignor to Allis-Chalmers Manufacturing Company, Milwaukee, Wis., a corporation of Delaware Application March 17, 1939, Serial No. 262,342

30 Claims. (Cl. 74—333)

The invention relates to change speed transmissions of the intermeshing gear type, and one of the objects of the invention is to provide an improved arrangement of the gears in a transmission of this type, whereby a speed change may be effected within a relatively short space axially of the gears. More specifically, it is an object of the invention to provide an improved gear arrangement affording more than two speed changes within a short space axially of the gears.

Another object of the invention is to provide a transmission in which a plurality of loose gears on the driving shaft are connectable either directly or indirectly therewith for transmitting power to a driven shaft, counter-gearing being used to connect any one of the loose gears indirectly with the driving shaft and to rotate it relative thereto. In this connection it is a further object to the invention to provide improved means for establishing and interrupting the direct driving connections between the driving shaft and the loose gears, and for establishing and interrupting the indirect driving connections between the driving shaft and the loose gears.

Still another object of the invention is to provide a transmission in which two loose gears, as mentioned in the preceding paragraph, are used to provide for four speeds in the same direction, the speeds increasing in the following order: the first of the loose gears directly connected with the driving shaft; the second of the loose gears directly connected with the driving shaft; the first of the loose gears indirectly connected with the driving shaft; and the second of the loose gears indirectly connected with the driving shaft.

Another object of the invention is to provide a change speed transmission having a plurality of loose gears on the driving shaft which are respectively in constant mesh with driven gears on a work shaft, and in which the loose gears are also respectively in constant mesh with counter-gears rotatable about an axis radially spaced from the axes of the driving and work shafts, provisions being made for selectively transmitting power from the driving shaft to either of the loose gears on the driving shaft or to either of the counter-gears. In this connection, it is a further object of the invention to provide improved means for selectively transmitting power from the driving shaft to the loose gears and to the counter-gears.

A still further object of the invention is to provide an improved change speed transmission in which trains of constantly meshing gears are used to transmit power from a driving to a driven shaft in the same direction at different speed ratios, and in which the driven shaft may be rotated in opposite directions through an alternately meshable gear mechanism, the constantly meshing gear trains idling while the driven shaft is rotated in one direction or the other through the alternately meshable gear mechanism.

A still further object of the invention is to provide a transmission operable by a single hand lever to establish five forward speeds and one reverse speed, and in which the drive establishing positions of the hand lever are arranged as follows: first and reverse speed positions opposite to each other at one side of the neutral position; second and third speed positions opposite to each other at the other side of the neutral position; and fourth and fifth speed positions at the side of the second and third speed positions remote from the neutral position. Preferably, the reverse, second and fourth speed positions of the hand lever are arranged forwardly of the neutral position, and the first, third and fifth speed positions are arranged rearwardly of the neutral position of the hand lever.

A still further object of the invention is to provide a change speed transmission which is simple and compact in construction, efficient in operation, and which may be manufactured at relatively low costs.

These and other objects and advantages of the invention will be apparent from the following description of a preferred embodiment of the invention. Referring to the drawings forming part of this specification and in which like reference characters designate the same or similar parts in the various views:

Fig. 4 is a top view of the transmission shown in Figs. 1 and 3 with part of the cover and its associated parts removed to expose the shift bars;

Fig. 5 is a side view of the shift mechanism partly in section;

Fig. 6 is a section on line VI—VI in Fig. 5;

Fig. 7 is a section on line VII—VII of Fig. 5;

Figure 1:
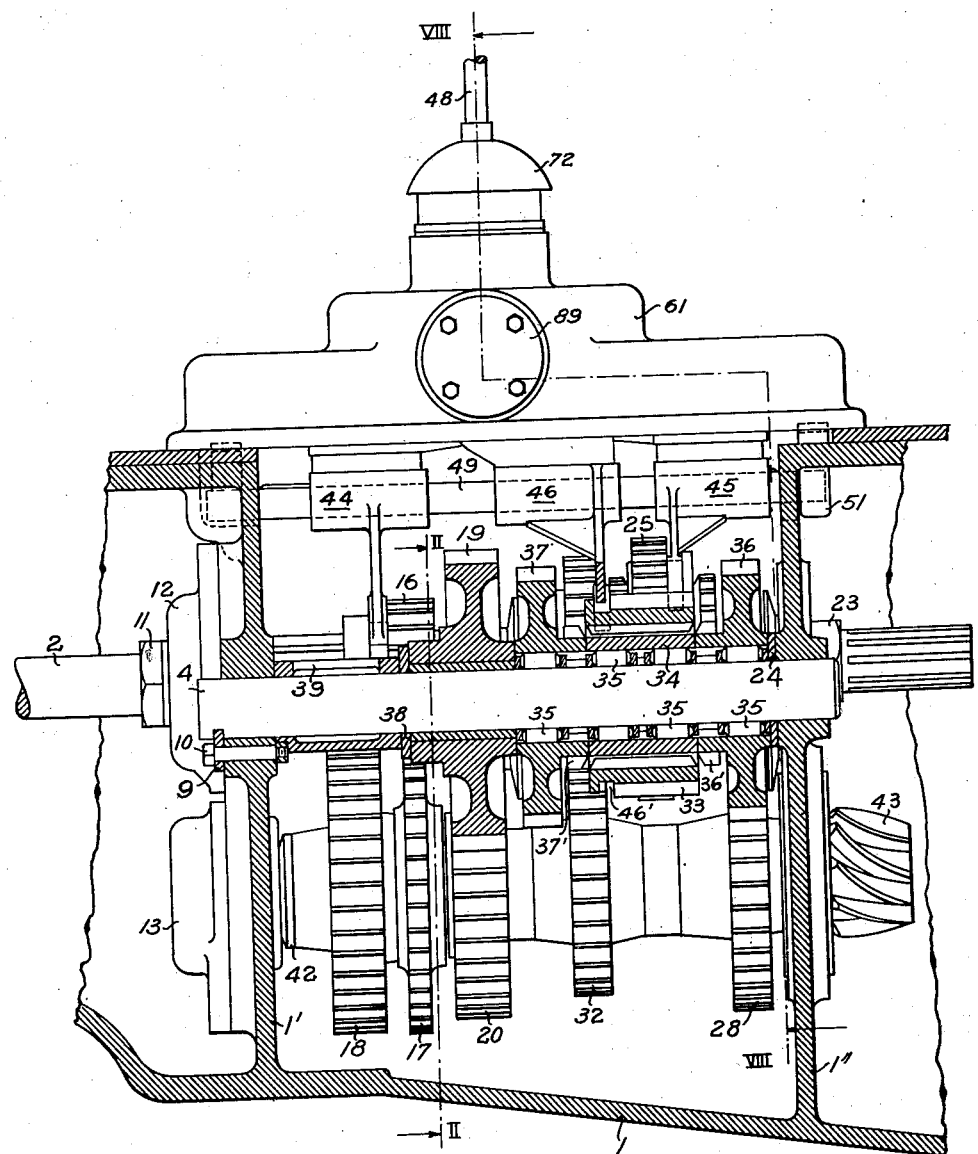
Fig. 1 is a side view, partly in section, of a transmission having five forward speeds and one reverse speed; the view being taken on line I—I of Fig. 2.
Figures 2, 3:
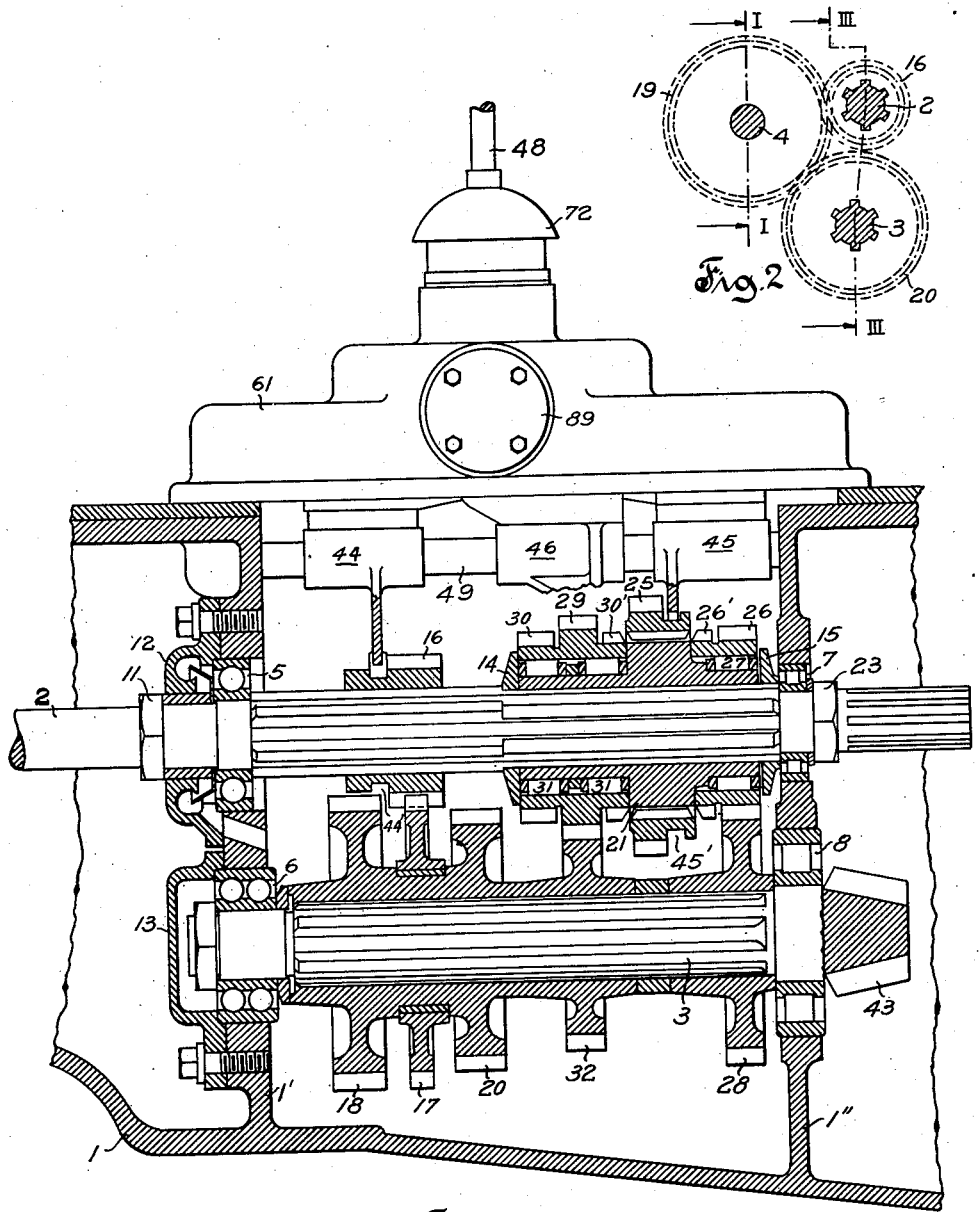
Fig. 2 is a diagrammatical transverse section of the transmission shown in Fig. 1, taken in the plane II—II of Fig. 1.
Fig. 3 is a view similar to Fig. 1 showing a section of the transmission taken on line III—III of Fig. 2.

Referring to Figs. 1 and 3 the reference numeral 1 designates a transmission housing having relatively spaced transverse walls 1' and 1". The forward transverse wall 1' has three bearing openings axially alined with three bearing openings in the rearward transverse wall 1". Extending through one of the bearing openings in the front wall and the alined bearing opening in the rear wall is a power shaft 2 which is journaled in the forward wall by a ball bearing 5 and in the rearward wall by a roller bearing 7. A countershaft 4 is stationarily mounted in another pair of the bearing openings in the front and rear walls as shown in Fig. 1, a lock plate 9 retained by a bolt 10 securing the countershaft 4 in axially fixed position. A work shaft 3 extends through the third pair of bearing openings in the front and rear walls of the transmission casing 1 and is journaled in the front wall by means of a double ball bearing 6 and in the rear wall by a roller bearing 8.

The power shaft 2 has a splined portion extending the entire length between the front and rear walls of the transmission casing and the power shaft is prevented from axial displacement by bearing retaining nuts 11 and 23. An oil seal 12 surrounds the power shaft 2 in proximity to the ball bearing 5 to prevent the escape of lubricant from the transmission housing through the ball bearing 5 and the bearing opening for the double ball bearing 6 is closed by a cover 13 which is secured to the outside of the forward wall of the transmission casing. The splined portion of the power shaft 2 between the front and rear walls of the transmission housing is reduced in diameter in the rearward portion of the transmission housing and a first speed and reverse pinion 16 is slidably mounted on the larger diameter portion of the power shaft in the forward part of the transmission housing. Mounted on the smaller diameter portion of the power shaft 2 in the rearward part of the transmission housing is an internal splined sleeve 21 which interlocks with the splines of the power shaft 2 and is retained against axial displacement thereon by retaining washers 14 and 15. The sleeve 21 has a radially projecting ring portion which is provided with a series of circumferential teeth. An internally and externally toothed ring gear 25 is axially slidable on the ring portion of the sleeve 21 and non-rotatably connected therewith by the outwardly projecting teeth of the ring portion which interlock with the inwardly projecting teeth of the ring gear 25. A ring gear 26 is rotatably mounted on the sleeve 21 at one side of the annular projection thereof by means of a roller bearing 27, the ring gear 26 having a clutch section 26' projecting axially therefrom towards the ring gear 25. The clutch section 26' has a series of peripheral teeth adapted to be engaged by the internal teeth of the ring gear 25 when the latter is moved towards the ring gear 26. Engagement of the clutch section 26' with the ring gear 25 while the latter is drivingly engaged by the sleeve 21 establishes a driving connection from the power shaft 2 to the gear 26.

A double gear comprising a large pitch diameter section 29 and a small pitch diameter section 30 is rotatably mounted on the sleeve 21 by means of rollers 31, the double gear being provided with a clutch section 30' corresponding to the clutch 26' and having a circumferential series of clutch teeth adapted to be engaged by the internal teeth of the ring gear 25 when the latter is moved to the left from the position in which it is shown in Fig. 3. Engagement of the ring gear 25 with the clutch section 30' establishes a driving connection between the power shaft 2 and the double gear 29, 30.

The work shaft 3 has a splined portion on which the following gears are non-rotatably and non-shiftably mounted. A first speed gear 18, a reverse speed gear 20 and a pair of gears 32 and 28, the first speed gear 18 is selectively connectable with the power shaft 2 by axial sliding movement of the pinion 16. The gear 28 of the work shaft is in constant mesh with the gear 26 of the power shaft and the gear 32 is in constant mesh with the large pitch diameter gear 29 of the power shaft. Rotatably mounted between the first speed gear 18 and reverse gear 20 of the work shaft is an idler gear 17 meshing with pinion 16 when the latter is positioned as shown in Fig. 3. The idler gear 17 has no driving connection with the work shaft, but serves to circulate lubricant within the transmission housing.

The countershaft 4, as stated, is non-rotatably mounted in the transmission housing and as shown in Fig. 1 carries a reverse idler 19 which is in permanent mesh with the reverse gear 20 of the work shaft 3. The pinion 16 on the power shaft may be moved into mesh with the reverse idler 19 by backward movement from the position in which the pinion 16 is shown in Figs. 1 and 3. Arranged between the reverse idler 19 and the forward wall of the transmission housing is a spacer 39 and a thrust washer 38 bearing against the hub of the reverse idler 19. Axially alined on the countershaft 4 in the space between the reverse idler 19 and the rearward wall of the transmission housing are two counter-gears 36 and 37 and a sleeve 34 interposed between the counter-gears 36 and 37. Roller bearings 35 arranged on the countershaft cooperate with the gears 36, 37 and the sleeve 34 to rotatably support these parts on the countershaft. The sleeve 34 has a series of circumferential teeth and an internally and externally toothed driven counter-gear 33 is slidably and non-rotatably mounted on the sleeve 34, the internal teeth of the counter-gear 33 interlocking with the external teeth of the sleeve 34. The hub of the counter-gear 36 has a clutch section 36' at the side thereof facing the counter-gear 33, the clutch section 36' having a circumferential series of teeth engageable by the internal teeth of the counter-gear 33 by axial movement of the latter on the sleeve 34. The counter-gear 33 may be moved axially towards the counter-gear 36 over the clutch section 36' and in this manner the counter-gears 33 and 36 may be connected for rotation in unison about the axis of the countershaft 4. The counter-gear 37 has a clutch section 37' projecting axially towards the counter-gear 33 and a series of circumferential clutch teeth on the clutch section 37' may be engaged by the internal teeth of the counter-gear 33 by axial movement of the counter-gear 33 towards the counter-gear 37. Movement of the counter-gear 33 towards the counter-gear 37 and over the clutch section 37' connects the counter-gears 33 and 37 for rotation in unison about the axis of countershaft 4. The counter-gear 36 is in constant mesh with the power shaft gear 26, and the countershaft gear 37 is in constant mesh with the small pitch diameter section 30 of the double gear 29, 30 of the power shaft. The counter-gear 33 is in constant mesh with the power shaft gear 25 and has a larger axial width than the power shaft gear 25. This arrangement permits axial shifting of the power shaft gear 25 and the counter-gear 33 relative to each other without moving these gears out of mesh. A thrust washer 24 is interposed between the hub of the counter-gear 36 and the rearward wall of the transmission housing and it will be noted that the gears 19, 36 and 37, while rotatable about the axis of the countershaft 4, are retained in axially fixed positions relative thereto.

It should be noted that the large pitch diameter section of the double gear 29, 30 projects into the space between the counter-gears 36 and 37 which arrangement is preferred because it results in a relatively close axial length of the transmission. It should also be noted that the pitch diameter of the power shaft gear 25 is larger than the pitch diameter of the power shaft gear 29 whereby interference of the counter-gear 33 with the power shaft gear 29 during shifting of the counter-gear 33 into clutching engagement with the counter-gear 37 is avoided.

It should also be noted that the gear 36 with its associated clutch section 36' and the gear 37 with its associated clutch section 37' are identical in shape, both gears having the same pitch diameter, but the gear 37 is mounted on the countershaft 4 in an inverted position relative to the gear 36 so that the clutch sections 36' and 37' bear against opposite ends of the sleeve 34. The duplicate use of the same gear, as explained with respect to the gears 36 and 37, is an advantage since it cheapens the costs of manufacture.

Figure 15:
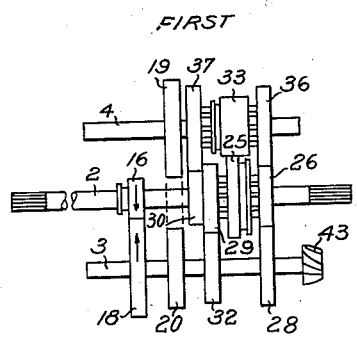
Figs. 15 to 20 are diagrammatic developed views showing different settings of the transmission for various speeds.

In operation rotary power, as from an internal combustion engine, is applied to the power shaft 2 and a driven member, such as a wheel driving axle of a motor vehicle, is rotated by the work shaft 3, a spiral bevel gear 43 for driving the ring gear of an axle drive mechanism of a motor vehicle being shown at the rear end of the work shaft 3. Fig. 15 shows the transmission set for driving the work shaft 3 from the power shaft 2 at a first or low speed forward. In this setting of the transmission the pinion 16 is in mesh with the low speed gear 18 on the work shaft, and the power shaft gear 25 and the counter-gear 33 occupy neutral positions so as to permit idling rotation of the constantly meshing gears 28, 26 and 36 and of the constantly meshing gears 32, 29 and of the constantly meshing gears 30 and 37. The counter-gear 33 is also idly rotated by the power shaft gear 25 while the work shaft 3 is being rotated at first or low speed through the pinion 16.

Figure 16:
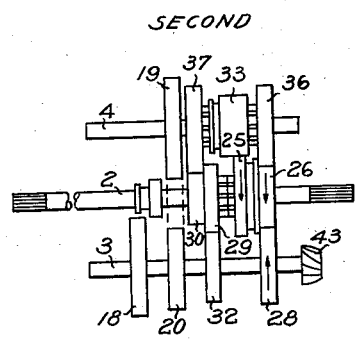

Fig. 16 shows the transmission set for rotation of the work shaft 3 at second speed forward. In this setting the pinion 16 is in a neutral position between the work shaft gear 18 and the reverse idler 19, and the power shaft gear 25 is in clutching engagement with the power shaft gear 26. The counter-gear 33 occupies a neutral position between the counter-gears 36 and 37, but is still in mesh with the power shaft gear 25. The pitch diameter of the power shaft gear 26 is larger than the pitch diameter of the pinion 16 and the second speed forward will therefore be higher than the first speed forward.

Figure 17:
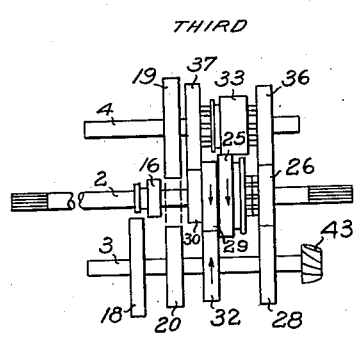

Fig. 17 shows the transmission set for third speed forward. In this setting the pinion 16 is positioned as for second speed forward, and the power shaft gear 25 is in clutching engagement with the double gear 29, 30. The counter-gear 33, while in constant mesh with the power shaft gear 25, occupies a neutral position between the counter-gears 36 and 37 so as to permit idling rotation of the counter-gears 36 and 37. The pitch diameter of the large pitch diameter section of the double gear 29, 30, in constant mesh with the work shaft gear 32, is larger than the pitch diameter of the power shaft gear 26 and the third speed forward will therefore be higher than the second speed forward.

Figure 18:
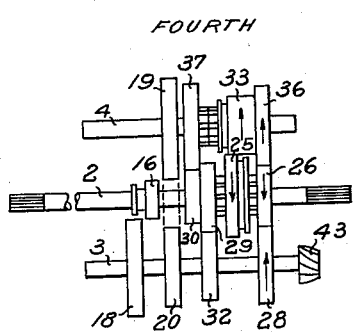

Fig. 18 shows the transmission set for fourth speed forward. In this setting the power shaft gear 25 occupies a neutral position between the power shaft gears 26 and 29 and the counter-gear 33 in constant mesh with the power shaft gear 25 is in clutching engagement with a counter-gear 36. The flow of power from the power shaft 2 is through the power shaft gear 25 to the counter-gear 33 and from the counter-gear 33 through the counter-gear 36 to the power shaft gear 26 and from the power shaft gear 26 to the work shaft gear 28. It should be noted that the pitch diameter of the pinion shaft gear 25 is larger than the pitch diameter of the counter-gear 33 and the pitch diameter of the counter-gear 36 is larger than the pitch diameter of the power shaft gear 26. In fourth speed forward the work shaft will therefore rotate at a higher rate of speed than in third speed forward.

Figure 19:
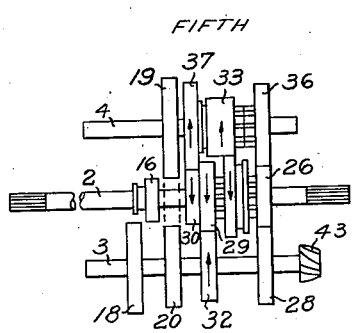

Fig. 19 shows the transmission set for fifth speed forward. In this setting the pinion 16 is positioned as in the second, third and fourth speeds. The power shaft gear 25 occupies a neutral position between the power shaft gears 26 and 29 and the counter-gear 33 while in constant mesh with the power shaft gear 25 is moved into clutching engagement with the counter-gear 37. The pitch diameter of the counter-gear 37 is larger than the pitch diameter of the power shaft gear 30 with which it is in constant mesh, and the pitch diameter of the power shaft gear 29 is larger than the pitch diameter of the power shaft gear 30. In fifth speed forward the work shaft 3 will therefore be rotated at a higher rate of speed than at the fourth speed forward.

Figure 20:
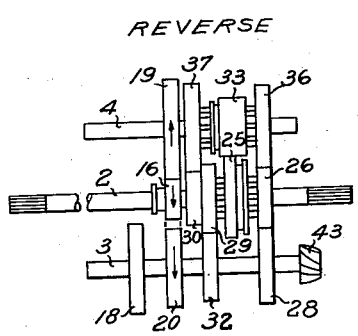

Fig. 20 shows the transmission set for reverse speed. The pinion 16 is in mesh with the reverse idler 19 which in turn is in constant mesh with the work shaft gear 20. The power shaft gear 25 and the counter-gear 33 are in neutral positions permitting idling rotation of the power shaft gears 26 and 29, 30, and of the counter-gears 36 and 37.

The constant mesh arrangement of the gears 28, 26 and 36, and the constant mesh arrangement of the gears 32 and 29 and 30 and 37, and the constant mesh arrangement of the gears 25, 33 results in easy shifting with respect to second, third, fourth and fifth speeds forward and eliminates the battering of the driving teeth which usually accompanies the shifting of driving and driven gears into mesh with each other.

The mechanism for shifting the pinion 16 and the gears 25 and 33 comprises three shift forks 44, 45 and 46 which are slidably arranged on a shaft 49 mounted in the upper portion of the transmission housing by means of brackets 50 and 51. As shown in Figs. 5 and 6 the bracket 50 is seated in a pocket 41 of the forward wall of the transmission casing, the bracket being retained on the transmission casing by means of bolts 50'. The pocket 41 is extended laterally to receive part of the hub of the shift fork 44 when the latter is moved forwardly to engage the pinion 16 with the first forward speed gear 18. The bracket 50 is permanently secured to the rod 49 by welding as indicated in Fig. 6. The bracket 51 at the rear end of the shaft 49 projects into a hole 42 in the rear wall of the transmission casing as indicated in Figs. 5 and 7 and retained in place by bolts 51'. The bracket 51 is slidably removable from the shaft 49 to permit assembly and dissembly of the shift forks 44, 45 and 46 on the shaft 49.

Figure 8:
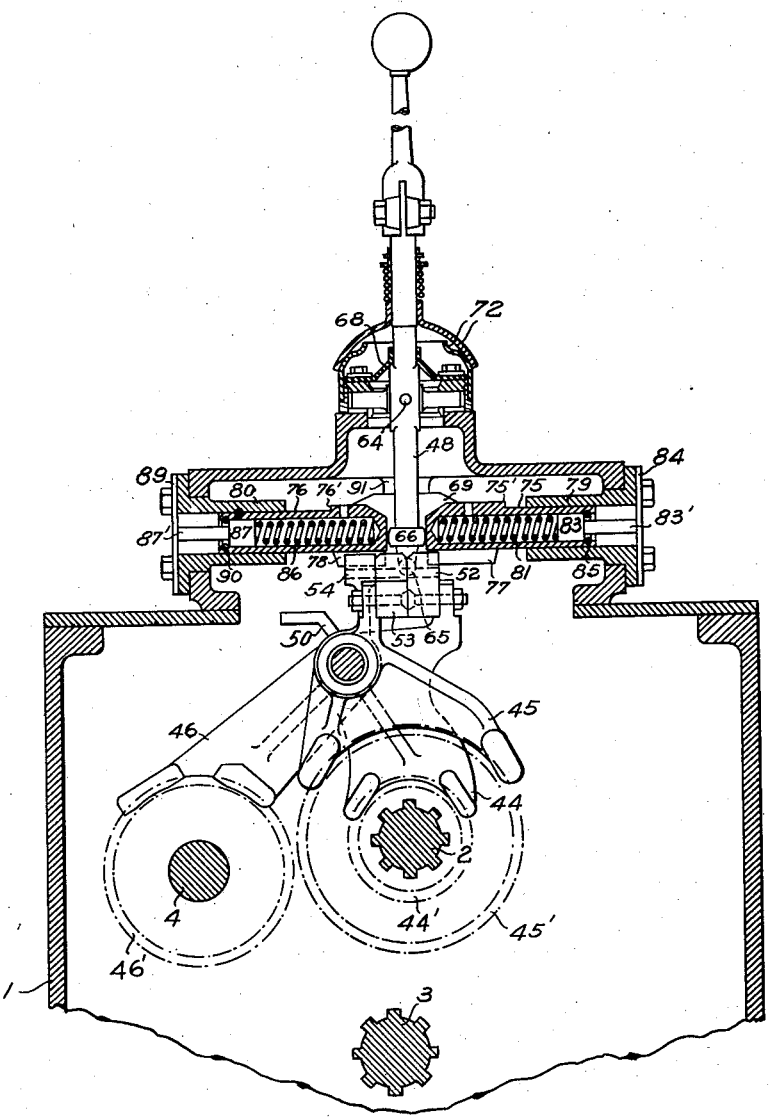
Fig. 8 is a section on line VIII—VIII of Fig. 1; the transmission gears being omitted to expose the shift forks.

The shift fork 44 has a forked portion engaging a groove 44' in the hub of the pinion 16 and the shift fork 45 has a forked portion engaging a groove 45' in the power shaft gear 25, as shown in Fig. 3, and the shift fork 46 has a forked portion engaging a groove 46' in the countergear 33 as shown in Fig. 1. Referring to Figs. 4 and 5, it will be seen that a shift bar 52 is secured to the hub of the shift fork 44 and extends parallel to the rod 49 in a rearward direction. A shift bar 53 is secured to the hub of the shift fork 45 and extends parallel to the rod 49 in a forward direction and in juxtaposition to the shift rod 52. A shift bar 54 projects from the hub of the shift fork 46 and extends parallel to the rod 49 and in juxtaposition to the shift rod 53. Each of the shift rods 52, 53 and 54 has a recess 47 in its upper edge for the reception of the lower end of a gear shift lever 48. As shown in Fig. 8 the gear shift lever 48 is universally mounted by means of a gimbal joint 64 on a cover 61 which is bolted to the transmission housing 1. The gimbal joint 64 is protected by a flexible boot seal 68 and a spherical seal 72.

Figure 9:
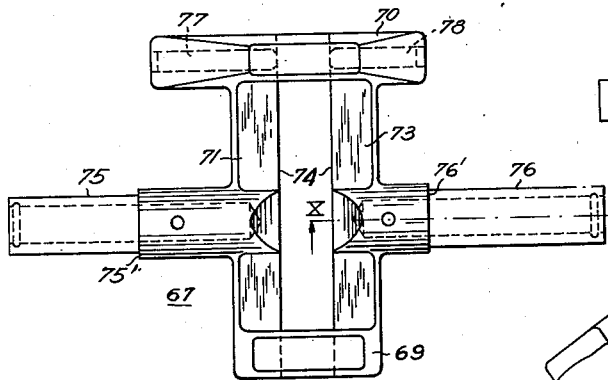
Fig. 9 is a top view of a tumbler forming part of the shift mechanism.
Figure 10:
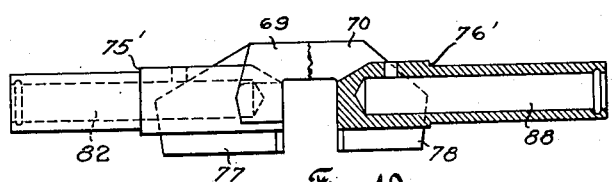
Fig. 10 is an end view of the tumbler shown in Fig. 9, one-half of the tumbler being shown in section on line X—X of Fig. 9.
Figure 11:
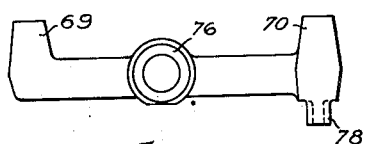
Fig. 11 is an end view of the tumbler shown in Fig. 10.

In Fig. 4 the shift bars are shown in their neutral positions, that is, in the positions in which the pinion 16 is out of mesh with the first speed gear 18 and the reverse idler 19 and in which the power shaft gear 25 and the countergear 33 are disconnected from the clutch sections 26' and 30' and from the clutch sections 36' and 37', respectively. In the neutral position of the shift bars 52, 53 and 54, the gear shift lever 48 may be moved transversely of the shift bars within the recesses 47 thereof, these recesses being in alined position as shown in Fig. 4. The lower end of the shift lever 48 which enters the recesses 47 is provided with a ball portion 65 of smaller width transversely of the shift bars than the width of each individual shift bar as shown in Fig. 8. At a short distance above the ball portion 65 of the shift lever a spherical portion 66 is formed on the shift lever, the portion 66 cooperating with a tumbler 67 shown in detail in Figs. 9, 10 and 11.

The tumbler 67 is formed in one piece and comprises a narrow bridge section 69 and a wide bridge section 70 connected by side sections 71 and 73. The side sections 71 and 73 are relatively spaced leaving an open slot 74 between them, and bearing arms 75 and 76 extend laterally from the side sections 71 and 73, respectively, in opposite directions. Extending downwardly from the bridge section 70 at one side of the slot 74 is a locking tongue 77, and another locking tongue 78 alined with the locking tongue 77 extends downwardly from the bridge portion 70 at the other side of the slot 74. The width of the space between the relatively opposed edges of the locking tongues 77 and 78 is only slightly larger than the transverse width of the shift bars 52, 53 and 54, as may be seen from Figs. 12, 13 and 14, each of these shift bars being intended to slide longitudinally through the space between the locking tongues 77 and 78.

Referring to Fig. 8, it will be seen that the bearing arms 75 and 76 of the tumbler 67 are longitudinally slidable in bearing bushings 79 and 80 mounted in the cover 61. A spring 81 is placed into a longitudinal bore 82 of the bearing arm 75 and bears at one end against the closed end of the bore and at the other end against a plunger 83, the plunger 83 having a rod 83' extending towards a plate 84 secured to the bearing bushing 79. A spring ring 85 in the end of the bore 82 limits the outward movement of the plunger 83 within the bore 82. A spring and plunger 86 and 87 similar to the spring and plunger 81 and 83 are arranged in a bore 88 of the bearing arm 76, the plunger 87 having a plunger rod 87' extending towards plate 89 secured to the bearing bushing 80 and a spring ring 90 similar to the spring ring 85 limits outward movement of the plunger 87 within the bore 88 of the bearing arm 76. The bridge section 69 of the tumbler slidably engages a lug 91 formed on the cover 61 forwardly of the shift lever 48 and the bridge section 70 slidably engages a lug 92 similar to the lug 91 formed on the cover 61 rearwardly of the shift lever 48 as shown in Fig. 5. Fig. 8 shows the tumbler in what will be called its "neutral" position. In this position the plungers 83 and 87 are seated against the spring rings 85 and 90, and movement of the tumbler transversely of the shift bars 52, 53 and 54 is impeded by contact of the plunger rods 83' and 87' with the plates 84 and 89, respectively. The springs 81 and 86 cooperating with the tumbler and with the plungers 83 and 87, and the plunger rods 83' and 87' cooperating with the plates 84 and 89 yieldingly retain the tumbler in its neutral position in which it is shown in Fig. 8. The spherical portion 66 of the shift lever 48 is positioned in the open slot 74 of the tumbler 67. The portion 66 fits snugly into the slot 74 of the tumbler and the shift lever 48 is consequently retained in its neutral position in which it is shown in Fig. 8 as long as the tumbler 67 occupies its neutral position. Movement of the shift lever 48 transversely of the shift bars 52, 53 and 54 in opposite directions will cause a corresponding movement of the tumbler 67. The bearing arm 75 of the tumbler has a shoulder 75' which limits movement of the tumbler in one direction by contact of the shoulder 75' with the bearing bushing 79, while movement of the tumbler in the opposite direction is limited by contact of a shoulder 76' on the bearing arm 76 with the bearing bushing 80.

The plane of the locking tongues 77 and 78 intersects the shift bars 52, 53 and 54 on the dash-dotted line A—A indicated in Fig. 4. The shift bar 52 has a notch 55 which coincides with the plane of the locking tongues 77, 78 when the shift bar occupies its neutral position in which it is shown in Fig. 4. The shift bars 53 and 54 each have a similar notch 55 which coincides with the plane of the locking tongues 77, 78 when the shift bars occupy the neutral position in which they are shown in Fig. 4. In the neutral position of the shift bars, and in the neutral position of the tumbler, the locking tongue 77 of the tumbler projects into the notch 55 of the shift bar 52 and the locking tongue 78 of the tumbler projects into the notches 55 of the shift bars 53 and 54 as shown in Fig. 8. In the neutral position of the tumbler shown in Fig. 8 the ball portion 65 of the shift lever 48 occupies a position between the shift bars 52 and 53, but since the recesses 47 of the shift bars are alined in the neutral position of the shift bars, the shift lever may be moved transversely of the shift bars either to the right or left so as to position the ball portion 65 entirely in the recess 47 of any of the shift bars as illustrated in Figs. 12, 13 and 14.

Figure 12:
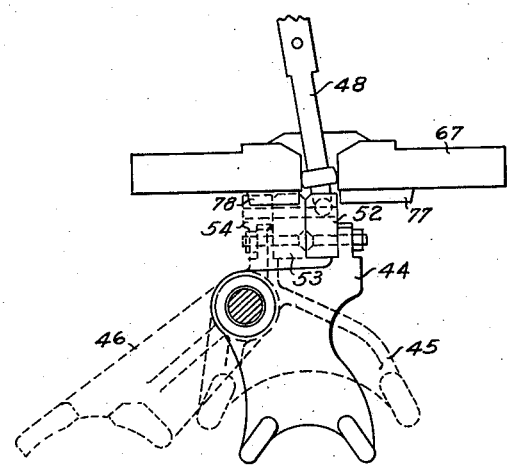
Figs. 12, 13 and 14 are views similar to Fig. 8 showing the shift lever in different positions.

When the shift lever 48 is moved into the position shown in Fig. 12, the tumbler 67 is moved by the spherical portion 66 of the shift lever against the pressure of the spring 81 and the locking tongue 77 of the tumbler is withdrawn from the notch 55 of the shift bar 52 while the locking tongue 78 of the tumbler occupies a position in the notches 55 of the shift bars 53 and 54 and prevents longitudinal movement of the shift bars 53 and 54. In the position of the shift lever 48 as shown in Fig. 12, the shift bar 52 may be moved from its neutral position into a drive establishing position either forwardly or rearwardly by forward or rearward movement of the shift lever 48. During such movement of the shift lever its spherical portion 66 slides within the open slot 74 of the tumbler and the locking tongue 78 remains lockingly engaged with the shift bars 53 and 54. Movement of the shift bar 52 in a forward direction corresponding to a movement of the handle end of the shift lever 48 in a rearward direction, as indicated by arrow 93 in Fig. 5, brings the pinion 16 into mesh with the low speed gear 18, and when the pinion 16 is fully meshed with the gear 18 a groove 56 registers with the locking tongue 77. When the handle end of the shift lever 48 is now released the spring 81 urges the tumbler towards the left in Fig. 8 and the locking tongue 77 enters the groove 56 of the shift bar 52 and locks the shift bar in low speed position. When the tumbler moves to the left in Fig. 12 under the pressure of the spring 81, the ball portion 65 of the shift lever is moved into engagement with the adjacent face of the shift bar 53 and the locking tongue 77 will therefore not fully enter the groove 56. However, partial entry of the locking tongue 77 into the groove 56 will be sufficient to lock the shift bar 52 and at the same time the locking tongue 78 of the tumbler 67 will remain engaged with the notches 55 of the shift bars 53 and 54 to prevent longitudinal movement of these latter bars. In order to disengage the pinion 16 from the low speed gear 18 the operator moves the shift lever 48 again into the position in which it is shown in Fig. 12 in which position the shift lever may be moved back into neutral position to bring the notch 55 into the plane of the locking tongue 77 and upon release of the handle end of the shift lever 48 the spring 81 urges the shift lever into the neutral position in which it is shown in Fig. 8.

In order to engage the pinion 16 with the reverse idler 19 the shift lever 48 is moved from the position in which it is shown in Fig. 8 into the position in which it is shown in Fig. 12 and the shift lever is then moved forwardly until the pinion 16 is fully meshed with the reverse idler 19. Movement of the shift bar 52 in a rearward direction for establishing the reverse drive brings a groove 57 of the shift bar 52 into registry with the locking tongue 77 and upon release of the shift lever the spring 81 moves the locking tongue 77 partly into engagement with the groove 57 in substantially the same manner as described hereinbefore in connection with the establishment of the first forward speed drive.

Figure 13:
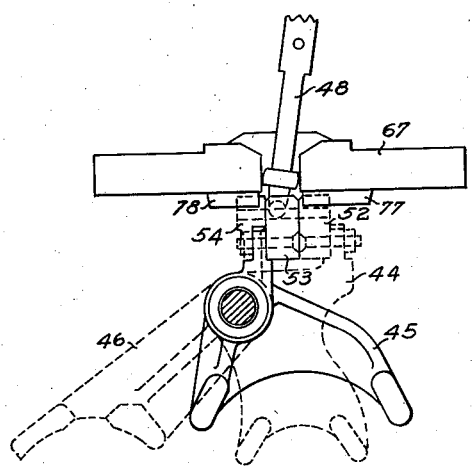
Figure 14:
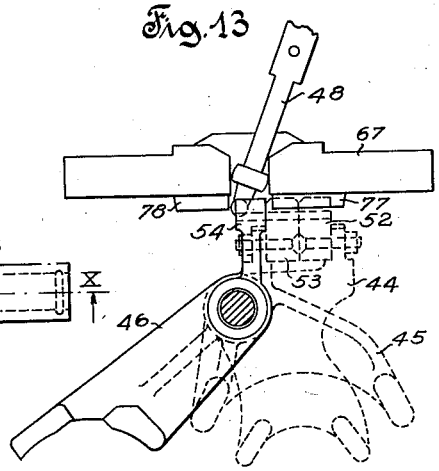

In order to move the power shaft gear 25 into engagement with the power shaft gear 26 for establishment of the second forward speed drive, the shift lever 48 is moved from the neutral position shown in Fig. 8 into the position in which it is shown in Fig. 13. It will be seen that in this position the locking tongue 77 locks the shift bar 53 by engagement of the locking tongue 77 with the notch 55 of the shift bar 52 and that the locking tongue 78 is withdrawn from the notch 55 of the shift bar 53 so that the shift bar will be free to move in a forward or rearward direction between the locking tongues 77 and 78. In the position of the shift lever 48 as shown in Fig. 13 the locking tongue 78 only engages the notch 55 of the shift bar 54 and locks this shift bar in neutral position. From the position in which the shift lever is shown in Fig. 13 its handle end may be moved in a forward direction opposite to the direction of arrow 93 indicated in Fig. 5 to cause movement of the shift bar 53 in a rearward direction and thereby engagement of the power shaft gear 25 with the power shaft gear 26. This movement of the shift bar 53 brings a groove 58 in the shift bar 53 into registry with the locking tongue 78, and upon release of the handle end of the shift lever 48 the spring 86 urges the locking tongue 78 into engagement with the groove 58, this movement being stopped by engagement of the ball portion 65 with the adjacent face of the shift bar 52. It will be seen that after completion of the second speed drive all shift bars are again positively locked in position.

In order to move the power shaft gear 25 into clutching engagement with the power shaft gear 29 for the establishment of third speed forward the shift lever 48 is moved into the position in which it is shown in Fig. 13 which movement liberates the shift bar 53 as explained hereinbefore in connection with the establishment of the second speed drive. Movement of the handle end of the shift lever 48 in a rearward direction brings the power shaft gear 25 into clutching engagement with the power shaft gear 29 and also a groove 59 of the shift bar 53 into registry with the locking tongue 78. Upon release of the handle end of the shift lever 48 the shift bar 53 will then be positively locked in position due to entry of the locking tongue 78 into the groove 59 under the pressure of the spring 86. It will be noted that upon completion of the third speed drive all shift bars are again positively locked in position.

Preparatory to establishment of fourth and fifth speed drive the shift lever 48 is moved into the position in which it is shown in Fig. 14. In this position the locking tongue 77 engages the notches 55 of the shift bars 52 and 53 and the locking tongue 78 is fully withdrawn from engagement with the shift bar 54 so that the latter may be moved to engage the counter-gear 33 with the counter-gear 36 for establishment of fourth speed drive. This movement of the shift bar 54 is accomplished by movement of the shift lever 48 in a forward direction opposite to the direction of the arrow 93 in Fig. 5 and brings a groove 62 in the shift bar 54 into registry with the locking tongue 78 of the tumbler. Upon release of the handle end of the shift lever 48 the spring 86 will therefore move the locking tongue 78 into the groove 62 and the ball portion 65 into engagement with the adjacent face of the shift bar 53. The shift lever 48 being prevented from returning to neutral position, the locking tongue 77 remains lockingly engaged with the shift bars 52 and 53 and in fourth speed drive all shift bars will therefore be again positively locked in position. Fifth speed drive is established by moving the shift lever 48 into the position in which it is shown in Fig. 14 and from that position in the direction of the arrow 93 in Fig. 5, which movement of the shift lever causes clutching engagement of the counter-gear 33 with the counter-gear 37 and brings a groove 63 of the shift bar 54 into registry with the locking tongue 78. Upon release of the handle end of the shift lever 48 the spring 86 moves the locking tongue 78 into engagement with the groove 63 and in fifth speed drive all shift bars are again positively locked in position in the same manner as explained hereinbefore in connection with the fourth speed drive.

Figure 21:
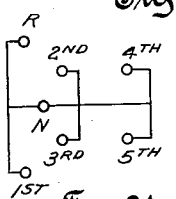
Fig. 21 is a shift diagram showing possible movements and positions of the handle end of the shift lever.

Fig. 21 is a shift diagram indicating the movements of the handle end of the shift lever for establishing the various speeds. The reverse speed position and the second and fourth speed positions of the handle end are adjacent to a plane through the forward transmission wall 1' and the first speed, third speed and fifth speed positions are adjacent to a vertical plane through the rear wall 1" of the transmission casing 1. The neutral position of the shift lever is indicated by the reference character N, and it will be noted that the first and reverse speed positions are located to one side of the neutral position, and the second and third speed positions to the other side of the neutral position, which arrangement is substantially the same as in a conventional three speed transmission except that the reverse speed and first speed positions are spaced wider apart from each other than the second and third speed positions. The shorter spacing of the second and third speed positions is caused by the fact that the power shaft gear 25 has a shorter axial travel between the power shaft gears 26 and 29 than the axial distance through which the pinion 16 must be moved between the gear 18 and the idler 19. As shown in Fig. 21 the fourth and fifth speed positions of the handle end of the shift lever 48 are to the right of the second and third speed positions, the lower speed being in advance of the neutral position and the higher speed to the rear of the neutral position the same as with respect to second and third speed. The final positions of the handle end are indicated by circles slightly offset from the lines indicating the movement of forward and rearward shift of the shift lever, the offsetting of the circles from the shift lines indicating the slight motion of the shift lever under the action of the springs 81 and 86 which causes the positive locking of the respective shift bar at the end of a shift.

While in the foregoing a preferred embodiment of the invention has been shown and described, it should be understood that it is not intended to limit the invention to the exact details of construction herein shown and described for various modifications within the scope of the claims may occur to persons skilled in the art.

It is claimed and desired to secure by Letters Patent:

1. In a change speed transmission, a power shaft, an axially movable driving clutch element on said power shaft and a driven clutch element engageable by said driving clutch element, means for shifting said movable clutch element to selectively connect it with and disconnect it from said driven clutch element, a first gear non-rotatably associated with said driving clutch element, a second gear non-rotatably associated with said driven clutch element, a work shaft, a gear non-rotatably connected with said work shaft and in constant mesh with said second gear, a countergear rotatable about an axis radially spaced from the axes of said power and work shafts and in constant mesh with said first gear, and selectively engageable and disengageable power transmitting means drivingly connected, respectively, with said second gear and with said countergear.

2. In a change speed transmission, a power shaft, an axially movable driving clutch element on said power shaft and a driven clutch element engageable by said driving clutch element, means for shifting said movable clutch element to selectively connect it with and disconnect it from said driven clutch element, a first gear non-rotatably associated with said driving clutch element, a second gear non-rotatably associated with said driven clutch element, a work shaft, a gear non-rotatably connected with said work shaft and in constant mesh with said second gear, a countergear rotatable about an axis radially spaced from the axes of said power and work shafts and in constant mesh with said second gear, and selectively engageable and disengageable power transmitting means drivingly connected, respectively, with said first gear and with said counter-gear.

3. In a change speed transmission, a power shaft, a first and a second power shaft gear axially alined on said power shaft, said first power shaft gear being non-rotatably connected with said power shaft and said second power shaft gear being rotatable independently thereof, and one of said power shaft gears being slidable axially of said power shaft, driving and driven clutch elements respectively associated with said first and second power shaft gears and relatively engageable and disengageable by axial movement of said slidable power shaft gear, a work shaft, a gear non-rotatably connected with said work shaft and in constant mesh with said second power shaft gear, a first counter-gear in constant mesh with said first power shaft gear, a second counter-gear in constant mesh with said second power shaft gear, and relatively engageable and disengageable power transmitting means respectively connected with said first and second counter-gears.

4. In a change speed transmission, a power shaft, a first and a second power shaft gear axially alined on said power shaft, said first power shaft gear being non-rotatably connected with said power shaft and said second power shaft gear being rotatable independently thereof, and one of said power shaft gears being slidable axially of said power shaft, driving and driven clutch elements respectively associated with said first and second power shaft gears and relatively engageable and disengageable by axial movement of said slidable power shaft gear, a work shaft, a gear non-rotatably connected with said work shaft and in constant mesh with said second power shaft gear, axially alined first and second counter-gears respectively in constant mesh with said first and second power shaft gears and rotatable independently of each other, one of said counter-gears being axially slidable relative to the other, and driving and driven clutch elements respectively associated with said first and second counter-gears and relatively engageable by axial movement of said slidable counter-gear.

5. In a change speed transmission, a power shaft, a first and a second power shaft gear axially alined on said power shaft, said first power shaft gear being non-rotatably connected with said power shaft and said second power shaft gear being rotatable independently thereof, and one of said power shaft gears being slidable axially of said power shaft, driving and driven clutch elements respectively associated with said first and second power shaft gears and relatively engageable and disengageable by axial movement of said slidable power shaft gear, a work shaft, a gear non-rotatably connected with said work shaft and in constant mesh with said second power shaft gear, axially alined first and second counter-gears respectively in constant mesh with said first and second power shaft gears and rotatable independently of each other, the counter-gear in constant mesh with said axially slidable power shaft gear being axially slidable relative to the other counter-gear, and driving and driven clutch elements respectively associated with said first and second counter-gears and relatively engageable and disengageable by axial movement of said slidable counter-gear.

6. In a change speed transmission, a power shaft, a first power shaft gear non-rotatably connected with and slidable axially of said power shaft, a second power shaft gear axially alined with and rotatable independently of said first power shaft gear, driving and driven clutch elements respectively associated with said first and second power shaft gears and relatively engageable and disengageable by axial movement of said first power shaft gear, a work shaft, a gear non-rotatably connected with said work shaft and in constant mesh with said second power shaft gear, axially alined first and second counter-gears respectively in constant mesh with said first and second power shaft gears and rotatable independently of each other, one of said counter-gears being axially slidable relative to the other, and driving and driven clutch elements respectively associated with said first and second counter-gears and relatively engageable by axial movement of said slidable counter-gear.

7. In a change speed transmission, a power shaft, a first power shaft gear non-rotatably connected with and slidable axially of said power shaft, a second power shaft gear axially alined with and rotatable independently of said first power shaft gear, driving and driven clutch elements respectively associated with said first and second power shaft gears and relatively engageable and disengageable by axial movement of said first power shaft gear, a work shaft, a gear non-rotatably connected with said work shaft and in constant mesh with said second power shaft gear, a first counter-gear in constant mesh with said first power shaft gear and slidable axially thereof, a second counter-gear axially alined with said first counter-gear and rotatable independently thereof, said second counter-gear being in constant mesh with said second power shaft gear, and driving and driven clutch elements respectively associated with said first and second counter-gears and relatively engageable by axial movement of said slidable counter-gear.

8. In a change speed transmission, a power shaft, a driving clutch element on said power shaft and driven clutch elements at opposite sides of and in axial alinement with said driving clutch element, means operable to selectively connect and disconnect said driving clutch element with either of said driven clutch elements, a first gear non-rotatably associated with said driving clutch element, second and third gears non-rotatably associated, respectively, with said driven clutch elements, a work shaft, a pair of gears non-rotatably connected with said work shaft and respectively in constant mesh with said second and third gears, a pair of counter-gears respectively in constant mesh with said second and third gears, and selectively engageable and disengageable power transmitting connections between each of said counter-gears and said first gear.

9. In a change speed transmission, a power shaft, a driving clutch element non-rotatably and slidably connected with said power shaft, a pair of driven clutch elements at opposite sides of and axially alined with said driving clutch element, means for axially shifting said driving clutch element to selectively connect it with and disconnect it from either of said driven clutch elements, a first gear non-rotatably associated with said driving clutch element, second and third gears non-rotatably associated, respectively, with said driven clutch elements, a work shaft, a pair of gears non-rotatably connected with said work shaft and in constant mesh, respectively, with said second and third gears, a counter-gear in constant mesh with said first gear, and rotary power transmitting means drivingly connected, respectively, with said second and third gears, independently of said work shaft gears, and selectively connectable with and disconnectable from said countergear.

10. In a change speed transmission, a power shaft, a driving clutch element non-rotatably and slidably connected with said power shaft, a pair of driven clutch elements at opposite sides of and axially alined with said driving clutch element, means for axially shifting said driving clutch element to selectively connect it with and disconnect it from either of said driven clutch elements, a first gear non-rotatably associated with said driving clutch element, second and third gears non-rotatably associated, respectively, with said driven clutch elements, a work shaft, a pair of gears non-rotatably connected with said work shaft and in constant mesh, respectively, with said second and third gears, a pair of counter-gears respectively in constant mesh with said second and third gears, and selectively engageable and disengageable power transmitting connections between each of said counter-gears and said first gear.

11. In a change speed transmission, a power shaft, a first power shaft gear non-rotatably connected with said power shaft, second and third power shaft gears rotatable independently of each other and of said power shaft about the axis of the latter, clutch mechanism associated with said power shaft and with said second and third power shaft gears and operable to alternately connect said second and third power shaft gears with said power shaft, a work shaft, a pair of gears non-rotatably connected with said work shaft and in constant mesh with said second and third power shaft gears, first, second and third counter-gears respectively in constant mesh with said first, second and third power shaft gears, said second and third counter-gears being rotatable independently of each other and of said first counter-gear, relatively engageable and disengageable power transmitting means respectively connected with said first and second counter-gears, and relatively engageable and disengageable power transmitting means respectively connected with said first and third counter-gears.

12. In a change speed transmission, a power shaft, a first power shaft gear non-rotatably connected with said power shaft, second and third power shaft gears rotatable independently of each other and of said power shaft about the axis of the latter, primary clutch mechanism associated with said power shaft and with said second and third power shaft gears and operable to alternately connect said second and third power shaft gears with said power shaft, a work shaft, a pair of gears non-rotatably connected with said work shaft and respectively in constant mesh with said second and third power shaft gears, first, second and third counter-gears respectively in constant mesh with said first, second and third power shaft gears, said second and third counter-gears being rotatable independently of each other and of said first counter-gear about the axis of the latter, and secondary clutch mechanism associated with said counter-gears and operable to alternately connect said second and third counter-gears with said first counter-gear.

13. In a change speed transmission, permanently meshing driving and driven gears each being axially shiftable relative to the other, a first pair of axially fixed gears at opposite sides of said driving gear and rotatable independently thereof and of each other about the axis of said driving gear, driving clutch elements on said driving gear alternately engageable with driven clutch elements on said first pair of gears by axial movement of said driving gear in opposite directions, a second pair of axially fixed gears at opposite sides of said driven gear and rotatable independently thereof and of each other about the axis of said driven gear, driving clutch elements on said driven gear alternately engageable with driven clutch elements on said second pair of gears by axial movement of said driven gear in opposite directions, said first pair of gears being in constant mesh with said second pair of gears; and a third pair of relatively non-rotatable gears in constant mesh with said first pair of gears.

14. In a change speed transmission, permanently meshing driving and driven gears each being axially shiftable relative to the other, a double gear having relatively large and small pitch diameter sections, axially alined with said driving gear and connectable therewith by axial movement of said driving gear, a counter-gear axially alined with said driven gear and connectable therewith by axial movement of said driven gear, said counter-gear being in constant mesh with one section of said double gear, and a gear rotatable about an axis radially spaced from the axes of said driving and driven gears and in constant mesh with the other section of said double gear.

15. In a change speed transmission, permanently meshing driving and driven gears each being axially shiftable relative to the other, a double gear having relatively large and small pitch diameter sections, axially alined with said driving gear and connectable therewith by axial movement of said driving gear, a counter-gear axially alined with said driven gear and connectable therewith by axial movement of said driven gear, said counter-gear being in constant mesh with said small pitch diameter section of said double gear, and a gear rotatable about an axis radially spaced from the axes of said driving and driven gears and in constant mesh with said large pitch diameter section of said double gear.

16. In a change speed transmission, permanently meshing driving and driven gears each being axially shiftable relative to the other, a double gear axially alined with said driving gear and connectable therewith by axial movement of said driving gear, said double gear having relatively large and small pitch diameter sections, the large pitch diameter section facing said driving gear, a counter-gear axially alined with said driven gear and connectable therewith by axial movement of said driven gear, said counter-gear being in constant mesh with said small pitch diameter section of said double gear, and a gear in constant mesh with said large pitch diameter section of said double gear.

17. In a change speed transmission, permanently meshing driving and driven gears, said driven gear being of larger axial width than said driving gear and each of said gears being axially shiftable relative to the other, a double gear axially alined with said driving gear and connectable therewith by axial movement of said driving gear, said double gear having relatively large and small pitch diameter sections, the large pitch diameter section facing said driving gear, a counter-gear axially alined with said driven gear and connectable therewith by axial movement of said driven gear, said counter-gear being in constant mesh with said small pitch diameter section of said double gear, and a gear in constant mesh with said large pitch diameter section of said double gear.

18. In a change speed transmission, permanently meshing driving and driven gears, said driving gear having a larger pitch diameter than said driven gear and each of said gears being axially shiftable relative to the other, a double gear having relatively large and small pitch diameter sections, axially alined with said driving gear and connectable therewith by axial movement of said driving gear, a counter-gear axially alined with said driven gear and connectable therewith by axial movement of said driven gear, said counter-gear having a pitch diameter larger than said small pitch diameter section of said double gear and being in constant mesh therewith; and a gear of a pitch diameter not larger than the pitch diameter of said large pitch diameter section of said double gear and in constant mesh therewith.

19. In a change speed transmission, first and second driven gears coaxially and non-rotatably connected with each other, primary and secondary gears coaxial with each other and respectively in constant mesh with said first and second driven gears, first and second counter-gears coaxial with each other and respectively in constant mesh with said primary and secondary gears, rotary driving means selectively connectable with either said primary or secondary gear, and rotary power transmitting means drivingly connected with said rotary driving means and selectively connectable with said first or second counter-gear.

20. In a change speed transmission, first and second driven gears coaxially and non-rotatably connected with each other, a primary gear in constant mesh with said first driven gear, a secondary gear having sections of different pitch diameters coaxial with said primary gear, one section of said secondary gear being in constant mesh with said second driven gear, a first counter-gear in constant mesh with said primary gear, a second counter-gear coaxial with said first counter-gear and in constant mesh with another section of said secondary gear, rotary driving means selectively connectable with either said primary or said secondary gear, and rotary power transmitting means drivingly connected with said rotary driving means and selectively connectable with said first or second counter-gear.

21. In a change speed transmission, a first and a second driven gear coaxially and non-rotatably connected with each other, a primary gear in constant mesh with said first driven gear, a secondary gear having relatively large and small pitch diameter sections coaxial with said primary gear, the large pitch diameter section of said secondary gear being in constant mesh with said second driven gear, a first counter-gear in constant mesh with said primary gear, a second counter-gear coaxial with said first counter-gear and in constant mesh with said small pitch diameter section of said secondary gear, rotary driving means selectively connectable with either said primary or secondary gear, and rotary power transmitting means drivingly connected with said rotary driving means and selectively connectable with said first or second counter-gear.

22. In a change speed transmission, a first and a second driven gear coaxially and non-rotatably connected with each other, a primary gear in constant mesh with said first driven gear, a secondary gear having relatively large and small pitch diameter sections coaxial with said primary gear, the large pitch diameter section of said secondary gear being in constant mesh with said second driven gear, first and second counter-gears of equal pitch diameters, respectively in constant mesh with said primary gear and with said small pitch diameter section of said secondary gear, rotary driving means selectively connectable with either said primary or secondary gear, and rotary power transmitting means drivingly connected with said rotary driving means and selectively connectable with said first or second counter-gear.

23. In a change speed transmission, a first and a second driven gear coaxially and non-rotatably connected with each other, a primary gear in constant mesh with said first driven gear, a secondary gear having relatively large and small pitch diameter sections coaxial with said primary gear, said second driven gear constantly meshing with said large pitch diameter section of said secondary gear, first and second counter-gears of equal pitch diameter, respectively in constant mesh with said primary gear and with said small pitch diameter section of said secondary gear, the pitch diameter of said counter-gears being larger than that of said small pitch diameter section, rotary driving means selectively connectable with either said primary or secondary gear, and rotary power transmitting means drivingly connected with said rotary driving means and selectively connectable with said first or second counter-gear.

24. A change speed transmission comprising, a power shaft, primary and secondary gears rotatable independently of each other and of said power shaft about the axis of the latter, said secondary gear having relatively large and small pitch diameter sections, a driving gear between said primary and secondary gears non-rotatably connected with said power shaft and alternately connectable with said primary and secondary gears by axial movements of said driving gear in opposite directions, first and second counter-gears respectively in constant mesh with said primary gear and with said small pitch diameter section of said secondary gear, said counter-gears being rotatable independently of each other about a common axis, a driven gear coaxial with said counter-gears and in constant mesh with said driving gear, said driven gear being alternately connectable with said counter-gears by axial movements of said driven gear in opposite directions, a work shaft, and a pair of work shaft gears non-rotatably connected with said work shaft and respectively in constant mesh with said primary gear and with said large pitch diameter section of said secondary gear.

25. A change speed transmission as set forth in claim 24, in which said driving gear has a larger pitch diameter than said driven gear in constant mesh therewith.

26. A change speed transmission as set forth in claim 24, in which said driven gear has a smaller pitch diameter than said driving gear and than said counter-gear in constant mesh with the small pitch diameter section of said secondary gear, and in which the pitch diameter of said large pitch diameter section of said secondary gear is not smaller than the pitch diameter of said work shaft gear in constant mesh therewith.

27. A change speed transmission as set forth in claim 24, in which the pitch diameter of said driving gear is larger than the pitch diameter of said driven gear and of the large pitch diameter section of said secondary gear, and in which the large pitch diameter section of said secondary gear faces said driving gear.

28. A change speed transmission as set forth in claim 24, in which the pitch diameter of said first counter-gear is equal to the pitch diameter of said second counter-gear.

29. A change speed transmission as set forth in claim 24, in which the pitch diameter of said first counter-gear is equal to the pitch diameter of said second counter-gear and larger than the pitch diameter of said driven gear, and in which the pitch diameter of said driven gear is smaller than the pitch diameter of the driving gear in constant mesh therewith.

30. In a change speed transmission, a work shaft having three forward speed gears and one reverse speed gear non-rotatably secured thereto in axially fixed positions, a power shaft having a pinion non-rotatably and slidably mounted thereon and a primary and secondary gear rotatably mounted on said power shaft and in constant mesh with the second and third of said forward speed gears, first, second and third axially alined counter-gears respectively in constant mesh with said reverse speed gear and with said primary and secondary power shaft gears, rotary driving means operable by said power shaft and selectively connectable with said primary or secondary power shaft gears, and rotary power transmitting means drivingly connected with said rotary driving means and selectively connected with said second and third counter-gears, said pinion being selectively engageable with the first of said forward speed gears and with the first of said counter-gears.

EMIL F. NORELIUS.